US011896981B2

(12) United States Patent
Lesar et al.

(10) Patent No.: US 11,896,981 B2
(45) Date of Patent: Feb. 13, 2024

(54) MACHINE FOR GRINDING MEAT AND BONE

(71) Applicant: Provisur Technologies, Inc., Chicago, IL (US)

(72) Inventors: Nick J. Lesar, Palmyra, WI (US); E. William Wight, Roscoe, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 0 days.

(21) Appl. No.: 18/061,552

(22) Filed: Dec. 5, 2022

(65) Prior Publication Data

US 2023/0097461 A1 Mar. 30, 2023

Related U.S. Application Data

(63) Continuation of application No. 16/833,501, filed on Mar. 27, 2020, now Pat. No. 11,633,743, which is a continuation of application No. 16/458,788, filed on Jul. 1, 2019, now Pat. No. 10,618,055, which is a continuation of application No. 14/966,460, filed on Dec. 11, 2015, now Pat. No. 10,350,605, which is a continuation of application No. 14/056,223, filed on (Continued)

(51) Int. Cl.

| | |
|---|---|
| ***B02C 18/30*** | (2006.01) |
| ***B02C 23/00*** | (2006.01) |
| ***B02C 23/10*** | (2006.01) |

(52) U.S. Cl.

CPC ............ *B02C 18/301* (2013.01); *B02C 18/30* (2013.01); *B02C 18/302* (2013.01); *B02C 18/305* (2013.01); *B02C 23/00* (2013.01); *B02C 23/10* (2013.01); *B02C 2018/308* (2013.01)

(58) Field of Classification Search

CPC ... B02C 18/301; B02C 18/305; B02C 18/308; B02C 23/10

See application file for complete search history.

(56) References Cited

U.S. PATENT DOCUMENTS

| | | | |
|---|---|---|---|
| 1,494,395 | A | 5/1924 | Wells |
| 3,298,057 | A | 1/1967 | Liebmann, Jr. |

(Continued)

OTHER PUBLICATIONS

European Patent Office, Extended European Search Report for Application No. 111602793, dated Jul. 23, 2013, 11 pages.

(Continued)

*Primary Examiner* — Faye Francis

(74) *Attorney, Agent, or Firm* — Klintworth & Rozenblat IP LLP

(57) ABSTRACT

A grinding machine for grinding foodstuffs, such as meat or the like, includes an orifice plate at the outlet of a grinding head. The orifice plate has collection passages that discharge a mixture of soft material and hard material through the orifice plate. A separator assembly is positioned downstream of the orifice plate for separating the soft material from the hard material. The separator assembly includes a separator chamber that receives the mixture of soft material and hard material, in combination with a rotatable separator screw positioned within the separator chamber. Rotation of the separator screw functions to separate the soft material from the hard material. Soft material is discharged through perforations in the separator chamber and hard material is discharged through a discharge of the separator chamber.

8 Claims, 6 Drawing Sheets

Related U.S. Application Data

Oct. 17, 2013, now Pat. No. 9,266,114, which is a continuation of application No. 13/073,587, filed on Mar. 28, 2011, now Pat. No. 8,584,978.

(60) Provisional application No. 61/318,630, filed on Mar. 29, 2010.

(56) References Cited

U.S. PATENT DOCUMENTS

| | | | |
|---|---|---|---|
| 3,376,910 | A | 4/1968 | Popeil |
| 3,739,994 | A | 6/1973 | McFarland |
| 3,741,772 | A | 6/1973 | McFarland |
| 3,743,192 | A | 7/1973 | Otto |
| 3,812,882 | A | 5/1974 | Taylor |
| 3,934,827 | A | 1/1976 | Seydelmann |
| 3,971,514 | A | 7/1976 | Martinelli et al. |
| 4,004,742 | A | 1/1977 | Hess |
| 4,025,001 | A | 5/1977 | Yarem et al. |
| 4,148,460 | A | 4/1979 | Kinsler |
| 4,186,216 | A | 1/1980 | Roth |
| 4,189,104 | A | 2/1980 | dos Santos |
| 4,232,425 | A | 11/1980 | Wojcik |
| 4,259,361 | A | 3/1981 | Procter |
| 4,358,061 | A | 11/1982 | Richter |
| 4,422,582 | A | 12/1983 | Roeger et al. |
| RE31,631 | E | 7/1984 | McFarland |
| 4,536,920 | A | 8/1985 | Amersfoort |
| RE32,050 | E | 12/1985 | McFarland |
| RE32,060 | E | 12/1985 | McFarland |
| 4,699,325 | A | 10/1987 | Hess |
| 4,795,104 | A | 1/1989 | Rudibaugh et al. |
| 4,807,816 | A | 2/1989 | Ataka |
| 4,881,690 | A | 11/1989 | Maier |
| 5,041,055 | A | 8/1991 | Roth |
| RE33,752 | E | 11/1991 | Poss |
| 5,088,689 | A | 2/1992 | Hendricks et al. |
| 5,251,829 | A | 10/1993 | Lesar |
| 5,289,979 | A | 3/1994 | Lesar et al. |
| 5,344,086 | A | 9/1994 | Lesar |
| 5,443,214 | A | 8/1995 | Lesar |
| 5,667,435 | A | 9/1997 | Baughman et al. |
| 5,906,154 | A | 5/1999 | Yoon et al. |
| 6,149,083 | A | 11/2000 | McFarland |
| 6,247,662 | B1 | 6/2001 | Hamilton |
| 6,471,503 | B1 | 10/2002 | Priest et al. |
| 7,114,671 | B2 | 10/2006 | David |
| 7,461,800 | B2 | 12/2008 | Lesar et al. |
| 7,484,680 | B2 | 2/2009 | Lesar et al. |
| 7,744,025 | B2 | 6/2010 | Lesar et al. |
| 7,946,517 | B2 | 5/2011 | Lesar et al. |
| 8,104,703 | B2 | 1/2012 | Vila Bonas |
| 8,584,978 | B2 | 11/2013 | Lesar et al. |
| 2005/0082402 | A1 | 4/2005 | Starlinger-Huemer |
| 2006/0292272 | A1 | 12/2006 | Roth |
| 2007/0090220 | A1 | 4/2007 | Lesar et al. |
| 2008/0057165 | A1 | 3/2008 | Roth |
| 2009/0080607 | A1 | 3/2009 | Hoffmann et al. |
| 2010/0122742 | A1 | 5/2010 | Lin et al. |
| 2011/0123676 | A1 | 5/2011 | Degn et al. |

OTHER PUBLICATIONS

Search Report for Brazilian Application No. PI1101194-7 dated Oct. 18, 2019, 4 pages.

Translation of Search Report for Brazilian Application No. PI1101194-7 dated Oct. 18, 2019, 5 pages.

FIG. 3
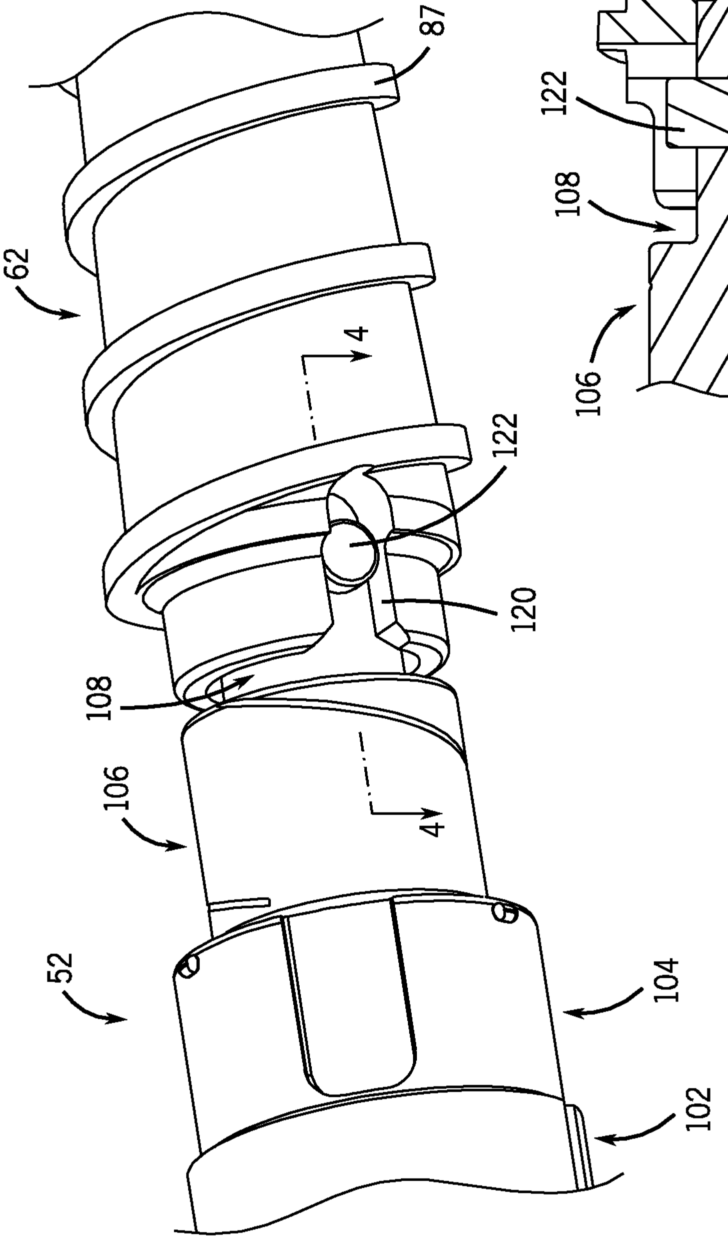
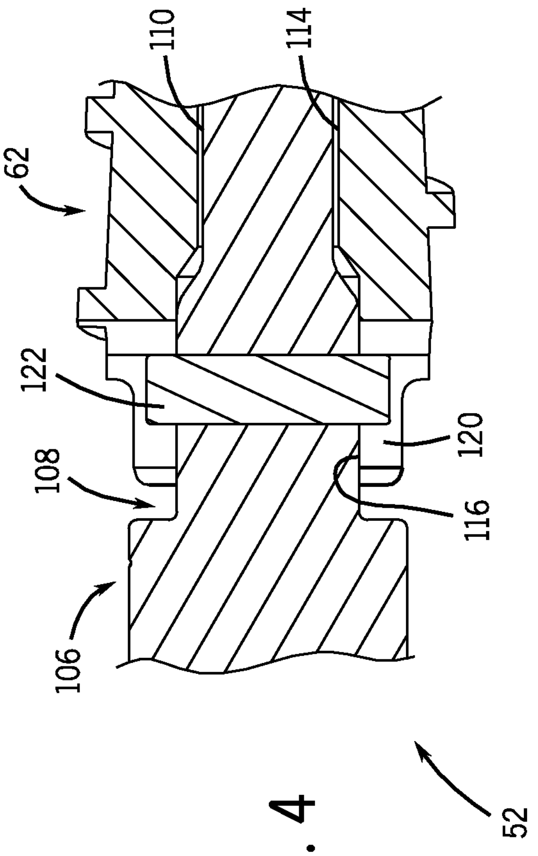
FIG. 4

MACHINE FOR GRINDING MEAT AND BONE

RELATED APPLICATIONS

The present application continuation of co-pending U.S. patent application Ser. No. 16/833,501, filed Mar. 27, 2020, which is a continuation of U.S. patent application Ser. No. 16/458,788, filed Jul. 1, 2019, now U.S. Pat. No. 10,618,055, which is a continuation of U.S. patent application Ser. No. 14/966,460, filed Dec. 11, 2015, now U.S. Pat. No. 10,350,605, which is a continuation of U.S. patent application Ser. No. 14/056,223, filed Oct. 17, 2013, now U.S. Pat. No. 9,266,114, which is a continuation of U.S. patent application Ser. No. 13/073,587, filed Mar. 28, 2011, now U.S. Pat. No. 8,584,978, which claims the benefit of U.S. Provisional Patent Application No. 61/318,630, filed Mar. 29, 2010, the entire disclosures of all of which are hereby incorporated by reference.

BACKGROUND AND SUMMARY

This invention relates to a grinding machine for foodstuffs such as meat, and more particularly to a recovery system for an orifice plate-type grinding machine that includes a hard material collection arrangement.

A typical grinding machine includes a hopper that receives material to be ground and an advancement mechanism such as a rotatable auger that conveys the material away from the hopper toward a grinding head. The grinding head typically includes a discharge opening or outlet within which an orifice plate is positioned. A knife assembly is located between the end of the auger and the orifice plate, and is typically engaged with the auger and rotatable in response to rotation of the auger. The knives of the knife assembly cooperate to shear the material as it is forced through the orifices of the orifice plate.

Systems have been developed for the purpose of preventing hard material from passing through the orifices of the orifice plate. In a meat grinding application, for example, such systems function to route hard material such as bone, gristle and sinew away from the grinding orifices of the orifice plate. Representative hard material collection systems are shown and described in U.S. Pat. No. 7,461,800 issued Dec. 9, 2008; U.S. Pat. No. 5,344,086 issued Sep. 6, 1994; U.S. Pat. No. 5,289,979 issued Mar. 1, 1994; and U.S. Pat. No. 5,251,829 issued Oct. 12, 1993, the entire disclosures of which are hereby incorporated by reference. Typically, hard material collection systems of this type route the hard material to collection passages located toward the center of the orifice plate, where the hard material is supplied to a discharge tube or the like.

The hard material that is discharged through the collection passages is typically contained within a mixture that includes both hard material and soft, usable material. Various arrangements have been developed to recover the soft, usable material within the mixture, some of which are shown and described in the above-noted patents.

It is an object of the present invention to provide an improved system for recovering the soft, usable material in the mixture of hard and soft material that is discharged from hard material collection passages in an orifice plate-type grinding machine. It is another object of the invention to provide such a system that requires little or no adaptation of the grinding components of the grinding machine. It is a further object of the invention to provide such a system that is capable of adjustment for accommodating different types of material.

In accordance with the present invention, a recovery arrangement for a grinding machine is in the form of a separator assembly located downstream of the orifice plate of the grinding machine. The separator assembly includes an upstream inlet that receives the mixture of soft material and hard material from the collection passages of the orifice plate, in combination with a separator chamber having a wall that defines an axially extending tapered separator passage. The separator passage receives the mixture of soft material and hard material from the upstream inlet. The wall of the separator chamber includes a series of perforations that communicate between the separator passage and an outer surface defined by the wall. The separator assembly further includes a separator screw disposed within the separator passage of the separator chamber. The separator screw is interconnected with the rotatable advancement member and is rotatable within the separator passage in response to rotation of the rotatable advancement member. Rotation of the separator screw causes separation of soft material from the mixture of soft material and hard material, and forces the soft material through the perforations in the wall of the separator chamber. The separator chamber defines a downstream end that includes an outlet for discharging hard material.

The separator assembly may include an open support extending outwardly from the grinding head, and the separator chamber is engaged with and supported by the support at a location downstream of the orifice plate. In one embodiment, a centering pin extends from the rotatable advancement member. The centering pin rotates with the rotatable advancement member and is engaged within a center opening defined by the orifice plate, and the separator screw may be engaged with the centering pin so as to be rotatable with the rotatable advancement member via engagement with the centering pin. Engagement structure is interposed between the centering pin and the separator screw for non-rotatably securing the separator screw to the centering pin. An adjustment arrangement is operable to adjust the axial position of the separator screw within the separator passage, and the engagement structure between the separator screw and the centering pin is configured to accommodate axial movement of the separator screw relative to the centering pin by operation of the adjustment arrangement. Representatively, the engagement structure may be in the form of a bore in the separator screw within which the centering pin is received, a transverse passage in the centering pin, a slot in the separator screw that overlaps the transverse passage, and a transverse engagement pin that extends through the slot and the transverse passage. With this arrangement, the slot accommodates axial movement of the separator screw relative to the centering pin.

In one embodiment, the support and the orifice plate are configured and arranged to prevent axial movement of the separator chamber. The adjustment arrangement may be carried by the support and interconnected with the separator screw for providing axial movement of the separator screw within the separator passage. The adjustment arrangement may be in the form of an axially extending threaded adjustment member that extends through the support and into engagement with a threaded passage extending inwardly from a downstream end defined by the separator screw.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 3 is an enlarged partial isometric view showing a portion of the separator-type recovery system of FIG. 1 and engagement of the separator screw with the centering pin of the grinding machine;

FIG. 4 is a partial section view taken along line 4-4 of the FIG. 3;

DETAILED DESCRIPTION

The various features and advantageous details of the subject matter disclosed herein are explained more fully with reference to the non-limiting embodiments described in detail in the following description.

Figure 1:
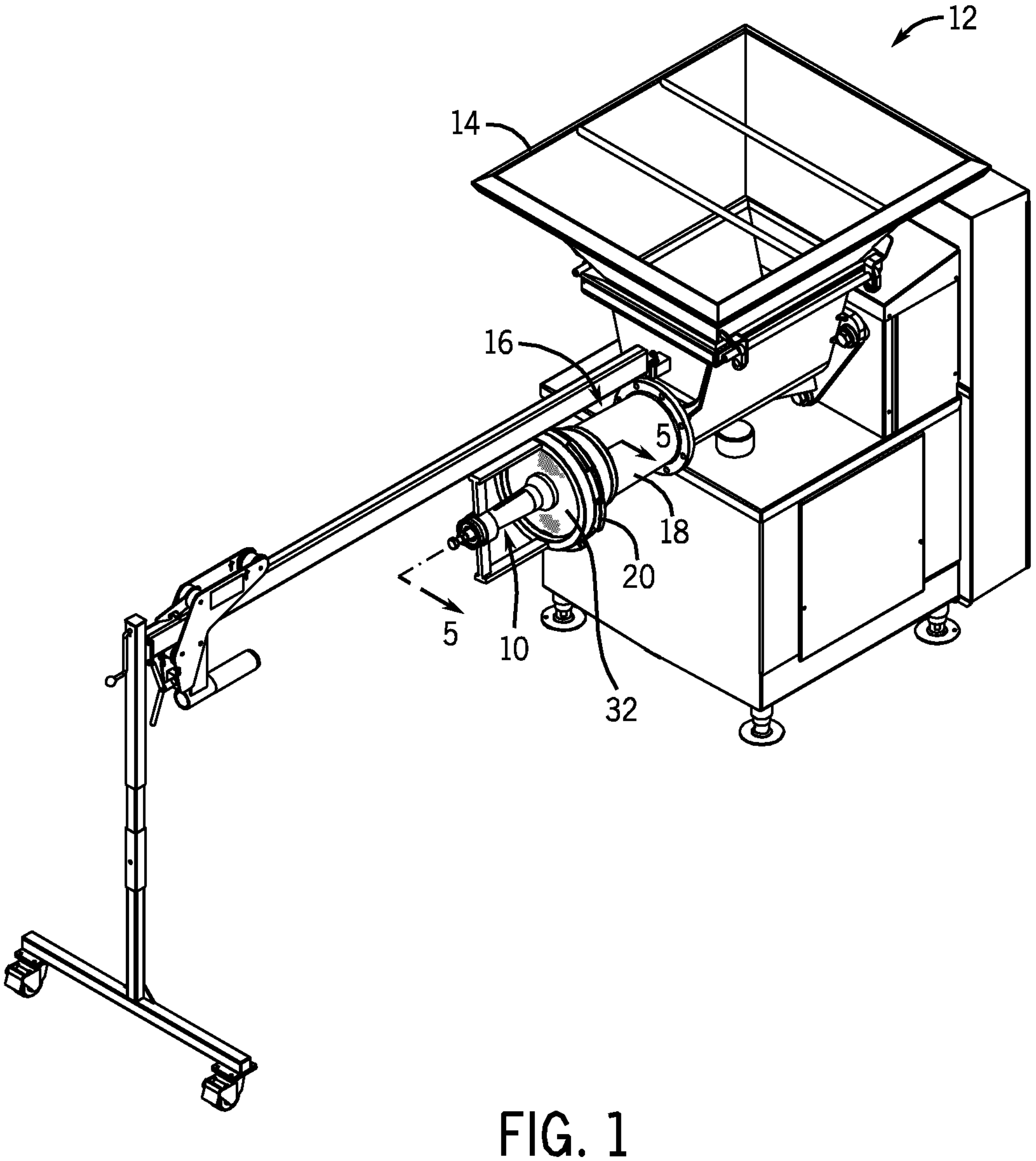
FIG. 1 is an isometric view of a grinding machine incorporating the separator-type recovery system of the present invention.
Figure 2:
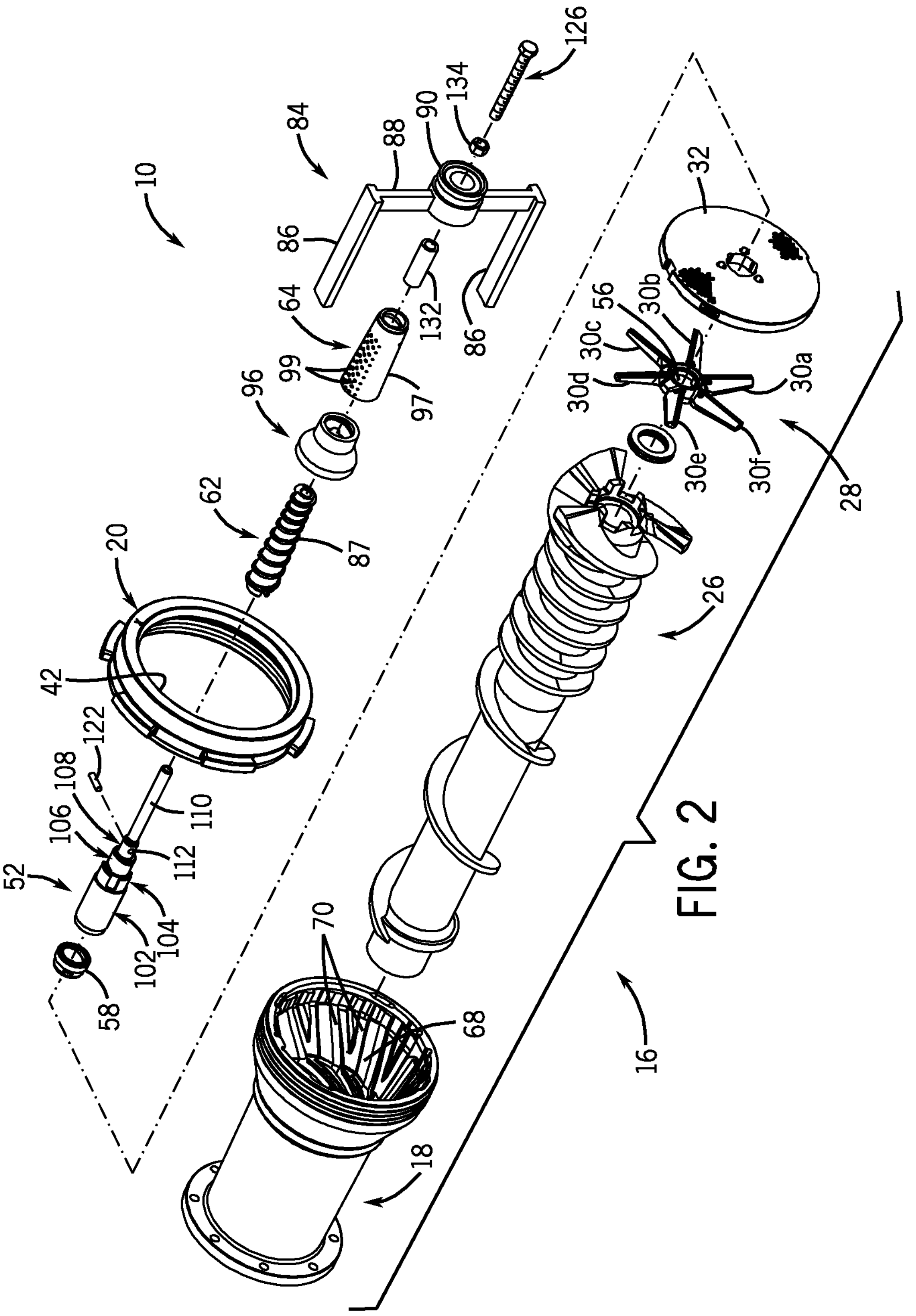
FIG. 2 is an exploded isometric view showing the components of the separator-type recovery system of FIG. 1.
Figure 5:
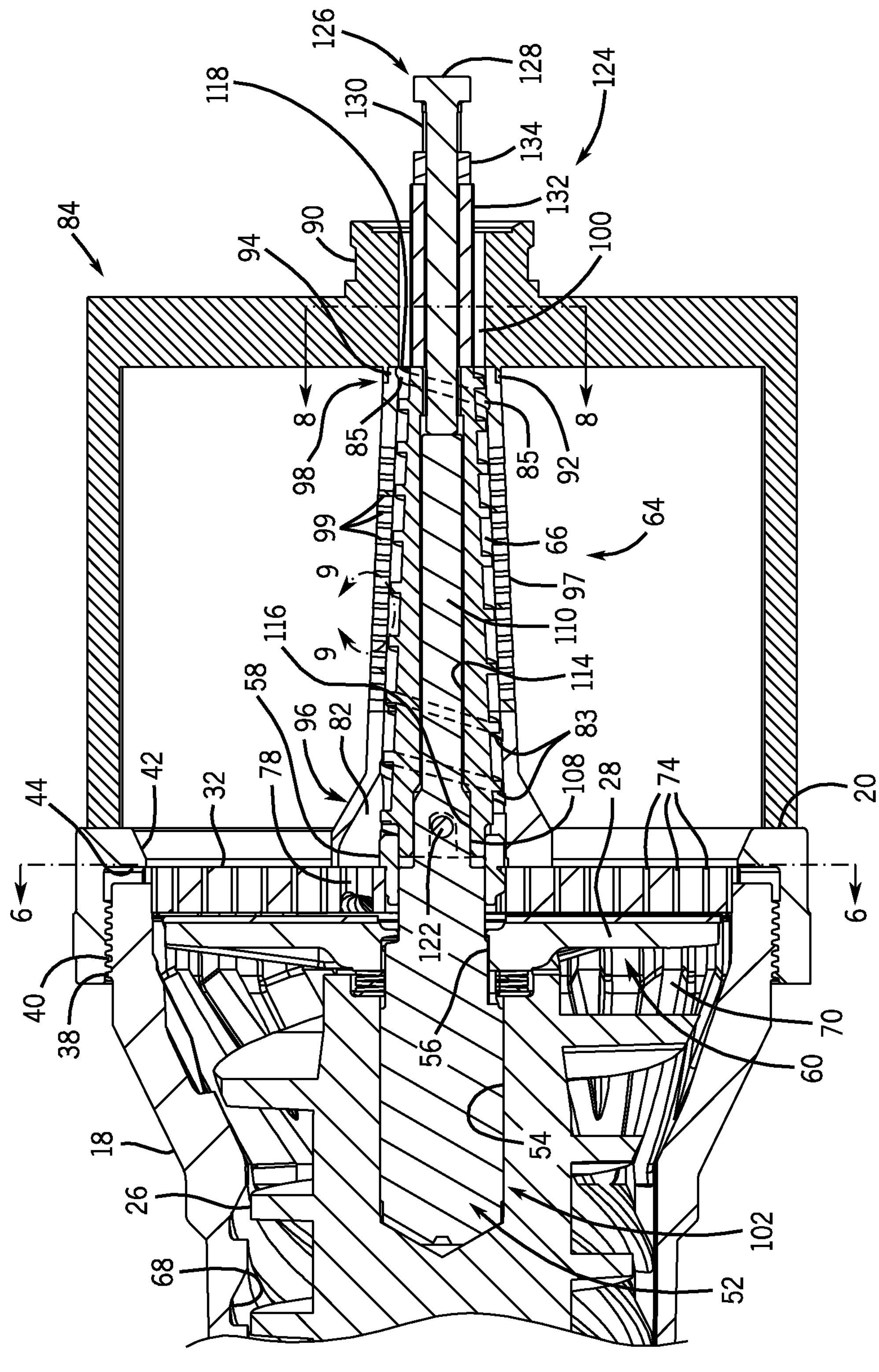
FIG. 5 is a partial section view taken along line 5-5 of FIG. 1.
Figure 7:
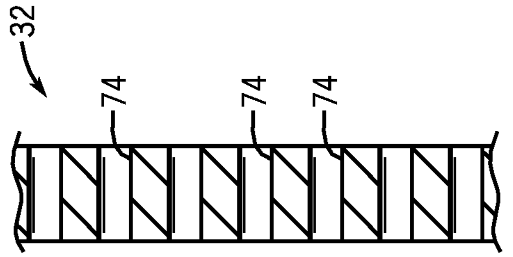
FIG. 7 is a partial section view taken along line 7-7 of FIG. 6.

The present invention is directed to a separator assembly 10 that can be coupled to a discharge or outlet end of a grinding machine, such as grinding machine 12. As generally known in the art, grinding machine 12 has a hopper 14 and a grinding arrangement shown generally at 16. In a manner as is known, grinding arrangement 16 includes a housing or head 18 which includes a mounting ring 20 that secures and orifice plate 32 within an opening or discharge outlet in the downstream end of grinding head 18. With reference to FIGS. 2 and 5, grinding machine 12 further includes a rotatable advancement member which may be in the form of a feed auger or screw 26 that is rotatably mounted within head 18 so that, upon rotation of feed screw 26 within head 18, material is advanced from hopper 14 through the interior of head 18. A knife holder 28 is mounted at the end of, and rotates with, feed screw 26. Knife holder 28 has a number of arms 30*a-f* and a corresponding number of knife inserts, one corresponding to each of arms 30*a-f*, and it is understood that any number of arms and corresponding inserts may be employed.

The knife holder 28 is located adjacent an inner grinding surface of orifice plate 32, which is secured in the open end of head 18 by mounting ring 20. The knife inserts bear against the inner grinding surface of orifice plate 32. In accordance with known construction, the end of head 18 is provided with a series of external threads 38, and mounting ring 20 includes a series of internal threads 40 adapted to engage the external threads 38 of head 18. Mounting ring 34 further includes an opening 42 defining an inner lip 44. While a threaded connection between mounting ring 34 and head 18 is shown, it is understood that mounting ring 34 and head 18 may be secured together in any other satisfactory manner.

A center pin 52 has its inner end located within a central bore 54 formed in the end of feed screw 26, and the outer end of center pin 52 extends through a central passage 56 formed in a central hub area of knife holder 28 and through the center of a bushing 58. In a manner to be explained, center pin 52 has a construction that is modified from that of a typical center pin, in order to accommodate the components of separator assembly 10. Bushing 58 supports center pin 52, and thereby the outer end of feed screw 26. In a manner to be explained, bushing 58 also functions to support certain components of the separator assembly 10 relative to orifice plate 32. The center pin 52 is non-rotatably secured to feed screw 26, such as by means of recessed keyways (not shown) on center pin 52 that correspond to keys (not shown) on the hub of knife holder 28, although it is understood that any other satisfactory engagement structure may be employed for ensuring that center pin 52 rotates with feed screw 26. Accordingly, rotation of feed screw 26 functions to rotate both center pin 52 and knife assembly 60, consisting of knife holder 28 and the knife inserts supported by the arms 30*a*-30*f* of knife holder 28. Bushing 58 and orifice plate 32 remain stationary, and rotatably support the end of center pin 52.

As understood in the art, the head 18 is generally tubular and thus includes an axial bore 68 in which feed screw 26 is rotatably mounted. Bore 68 is typically provided with flutes 70 for controlling the flow of material through head 18, i.e. for preventing material from simply rotating with feed screw and for providing a downstream flow path to prevent backpressure from pushing material back into hopper 14. Also as is known, the dimension of flutes 70 may vary along the flute length to produce different effects. Head 18 may have an increased diameter at its downstream end. Flutes 70 may be primarily located adjacent or along this increased diameter area. Flutes 70 may be dimensioned to move material more efficiently across the transition area between the main body of head 18 and the increased diameter area of head 18.

Figure 6:
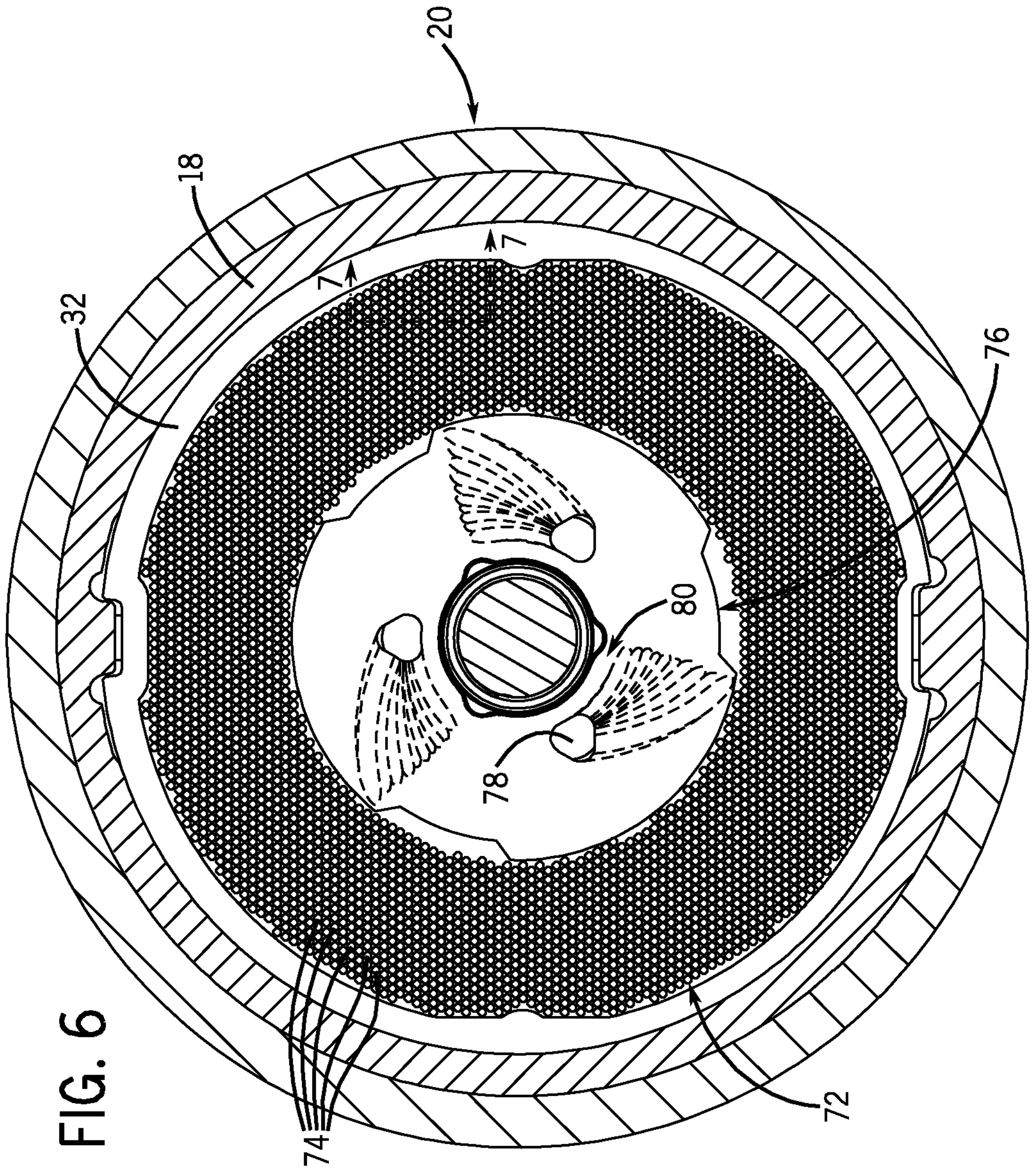
FIG. 6 is a section view taken along line 6-6 of FIG. 5.

Referring to FIG. 6, the orifice plate 32 has an outer section 72 that includes a large number of relatively small grinding openings 74, and an inner section 76 that includes a series of radially spaced collection passages 78. The size of grinding openings 74 varies according to the type of material being ground and the desired end characteristics of the ground material. In accordance with known grinding principles, material within head 18 is forced toward orifice plate 32 by rotation of feed screw 26 and through openings 74, with the knife inserts of rotating knife assembly 60 acting to sever the material against the inner grinding surface of orifice plate 32 prior to the material passing through openings 74.

In some instances, pieces of hard material, such as bone or gristle, which may be too large to pass through grinding openings 74, will be present along with the soft, useable material. These pieces, which are not cut by the action of the knife inserts against plate 32, are pushed toward inner section 76 of plate 32 by the rotating action of knife assembly 60, where the pieces of hard material can be removed from the primary ground material stream through collection passages 78. Collection passages 78 are large relative to grinding openings 74, and may be generally triangular, though it is understood that collection passages 78 may have any configuration as desired. Each of collection passages 78 may be provided with a ramped entryway 80 opening onto the surface of orifice plate 32. Ramped entryways 80 may be provided on both sides of plate 32, which may be double sided so as to extend the lifetime of use of plate 32.

Inevitably, the hard material that passes through collection passages 78 carries with it a certain amount of usable soft material. This mixture of soft and hard material passes through collection passages 78 of orifice plate 32 to the separator assembly 10, where it can be subjected to a secondary grinding and/or separation process to maximize ground material output. While it is advantageous to have separated as much usable soft material as possible from the hard material before it passes through the orifice plate 32, nevertheless, in most instances, good, usable soft material is carried with the hard material through the collection passages 78. In the past, conventional grinding machines have simply collected the hard material together with the soft material and treated them both as waste. The separator assembly 10 of the present invention, however, is designed to separate the usable soft material from the hard material that passes through the collection passages 78 of the orifice plate 32, deliver the soft material to an appropriate outlet, and pass the hard material to a discharge or collection arrangement.

Referring to FIGS. 2 and 5, the separator assembly 10 includes a separator auger or screw 62 that is secured to, and rotates with, the center pin 52. The separator assembly 10 also includes a separator chamber or tube 64 that defines a separator passage 66 that communicates with a collection tube or receptacle. Separator screw 62 is driven by feed screw 26, and extends through the passage of separator chamber 64 and into and through discharge passage 66. In addition, the separator assembly 10 includes a support 84, which serves to support the outer ends of separator screw 62 and separator chamber 64.

In the illustrated embodiment, the support 84 is in the form of a generally reverse C-shaped member including a pair of legs 86 that are connected together by an outer bridge section 88. The inner ends of legs 86 are adapted to be secured to the structure of grinding head 18, such as to the outwardly facing annular surface defined by mounting ring 20. Representatively, the inner ends of legs 86 may be secured to mounting ring 20 by welding, although it is understood that any other satisfactory arrangement may be employed. Support 84 provides an open configuration downstream of orifice plate 32, in that support 84 does not obstruct the discharge of material from the downstream surface of orifice plate 32. In addition, while support 84 is shown as a reverse C-shaped member, it is understood that support 84 may have any other satisfactory configuration.

At the center of bridge section 88, support 84 includes a support area shown generally at 90. Support area 90 functions to engage and support the outer end of separator chamber 64. In the illustrated embodiment, the support area 90 includes an annular lip 92 which defines a recess that faces orifice plate 32. The end of separator chamber 64 has a reduced diameter area 94 defining a shoulder that is received within the recess defined by the lip 92, which functions to securely engage and retain separator chamber 64 between support area 90 and orifice plate 32. With this arrangement, separator chamber 64 is engaged to between orifice plate 32 and support area 90 in a manner that prevents axial movement of separator chamber 64.

The separator chamber 64 of separator assembly 10 is in the form of a generally elongated and tubular body that tapers or narrows from an intake end 96 at the downstream surface of orifice plate 32 to a discharge end 98 that interfaces with the support area 90 of support 84 as noted above. The separator passage 66 of separator chamber 64 is configured to allow the separator screw 62 to be passed through the separator chamber 64 and coupled to the feed screw 26, so that the separator screw 62 rotates with the feed screw 26. It is understood, however, that the separator screw 62 could be directly coupled to the feed screw 26 or coupled using a suitable coupler.

In the illustrated embodiment as best shown in FIGS. 2 and 5, the separator chamber 64 has a two-piece construction. It is understood, however, that the separator chamber 64 may also have a one-piece construction or maybe formed of any other number of components. As shown, the intake end 96 of separator chamber 64 has a generally conical shaped inlet that defines a frustoconical inlet volume 82, which alternatively may be a series of individual inlet passages. The diameter of the intake end 96 is slightly greater than that of the inner section 76 of the orifice plate 32 so that the hard material that is passed through hard material collection passages 78 of the orifice plate 32 is received by the frustoconical inlet volume 82 of separator assembly 10.

The intake end 96 of separator chamber 64 is formed with spiral flutes 83. Similarly, the discharge and 98 of separator chamber 64 is provided with spiral flutes 85. The spiral flutes 83 cooperate with separator screw 62 to provide positive engagement and downstream advancement of the material as it passes through inlet volume 82 at the upstream end of separator chamber 64. Likewise, the spiral flutes 85 at the downstream end of separator chamber passage 66 provide positive engagement and downstream advancement of the material as it is discharged from separator chamber 64.

The intake end 96 of separator chamber 64 is formed with spiral flutes 83. Similarly, the discharge and 98 of separator chamber 64 is provided with spiral flutes 85. The spiral flutes 83 cooperate with separator screw 62 to provide positive engagement and downstream advancement of the material as it passes through inlet volume 82 at the upstream end of separator chamber 64. Likewise, the spiral flutes 85 at the downstream end of separator chamber passage 66 provide positive engagement and downstream advancement of the material as it is discharged from separator chamber 66.

The separator screw 62 includes helical pressure flights 87 that extend along its length. The diameter of the helical pressure flights 87 decreases from the intake end 96 to the discharge end 98. In this regard, the diameters of the pressure flights 87 decrease along the length of the separator screw 62 to match the taper of the passage 66 defined by the wall of the separator chamber 64, shown at 97. A series of discharge perforations or openings 99 are formed in the wall 97 of the separator chamber 64. The discharge openings 99 are formed in a perforation or hole zone of the separator chamber 64 located between the intake end 96 and the discharge end 98, and are designed to pass soft material from the passage 66 of the separator chamber 64 to the exterior of the separator chamber 64. The openings 99 are located between the spiral flutes 83 at the intake and 96 and the spiral flutes 85 at the discharge and 98 of separator chamber 64. The separator chamber wall 97 defines a smooth inner surface within the perforation or whole zone of the separator chamber 64.

The pressure flights 87 serve two primary functions. First, the flights 87 advance the mixture of soft and hard material from the collection cavity toward the discharge end 98 through the passage 66 of the separator chamber 64. Second, the flights 87 force the mixture of soft and hard material against the inner surface of the wall 97 of the separator chamber 64. As the separator screw 62 is rotated, flow of the mixture of soft and hard material through the passage 66 is restricted by the tapered inner surface of the wall 97. This restriction functions to separate the soft material from the hard material, and the pressure within the passage 66 of the separator chamber 64 functions to force the separated soft material through the discharge openings 99 in the wall 97. Moreover, since the separator chamber 64 is tapered, a shearing force applied to the mixture of soft and hard material by rotation of separator screw 62 remains relatively constant as it travels along the length of the separator chamber passage 66. As a result, a continuous shearing force is applied to the hard material even as it is reduced in size as it is forced through passage 66.

At the discharge and of the separator chamber 64, the passage 66 defined by the separator chamber 64 communicates with an outlet passage 100 that extends through support area 90 of support 84. In the illustrated embodiment, the outlet passage 100 is in the form of a constant diameter passage that extends from the downstream end of support area 90 to the upstream end, with the downstream end having a diameter that corresponds to the diameter of separator chamber passage 66 at discharge and 98. It is understood, however, that outlet passage 100 may flare outwardly in an upstream-to-downstream direction so as to relieve pressure when the hard material is discharged from separator chamber passage 66, to effectively release the hard material so that it can be propelled through outlet passage 100 to a collection arrangement, which may be a receptacle or a discharge conduit in a manner as is known.

Referring to FIGS. 2 and 5, centering pin 52 generally includes an inner section 102 that is configured to be received within the bore 54 in the end of feed screw 26. In addition, centering pin 52 includes a knife mounting section 104 that is engaged within passage 56 in the hub section of knife holder 28, and a bushing engagement section 106 that is received within the passage of bushing 58, to rotatably support the centering and 52 relative to orifice plate 32. In addition, the centering pin 52 includes a separator screw mounting section 108 adjacent bushing engagement section 106, and an extension section 110 that extends outwardly from separator screw mounting section 108. A transverse passage 112 extends through separator screw mounting section 108. Separator screw 62 has a generally hollow construction, defining an axial passage 114 extending throughout its length. At the inner or downstream end of separator screw 62, passage 114 has a slightly enlarged diameter relative to the remainder of the length of the passage 114, so as to define a recess 116 that extends into the inner end of separator screw 62. At its outer or downstream end, passage 112 is formed with a series of internal threads 118. In assembly, separator screw 62 is engaged with centering pin 52 such that extension section 110 of centering pin 52 is received within axial passage 114 of separator screw 62. When separator screw 62 is fully engaged with centering pin 52, separator screw mounting section 108 of centering pin 52 is received within recess 116 in the inner or downstream end of separator screw 62. As shown in FIG. 5, there are close tolerances between the outside surfaces of separator screw mounting section 108 and extension section 110 and the respective facing surfaces of recess 116 and axial passage 114, so that separator screw 62 is centered on the longitudinal axis of centering pin 52.

Referring to FIGS. 3 and 4, the inner end of separator screw 62 is formed with a pair of transversely aligned slots 120, which extend in a downstream direction from the inner or upstream end of separator screw 62. In order to non-rotatably mounted separator screw 62 to centering pin 52, a drive pin 122 extends through transverse passage 112 in separator screw mounting section 108 such that its ends are positioned within slots 120. In this manner, separator screw 62 is mounted to drive pin 122 in a manner that ensures separator screw 62 rotates with centering pin 52, while enabling axial movement of separator screw 62 relative to drive pin 122 by movement of slots 120 relative to drive pin 122.

Figure 8:
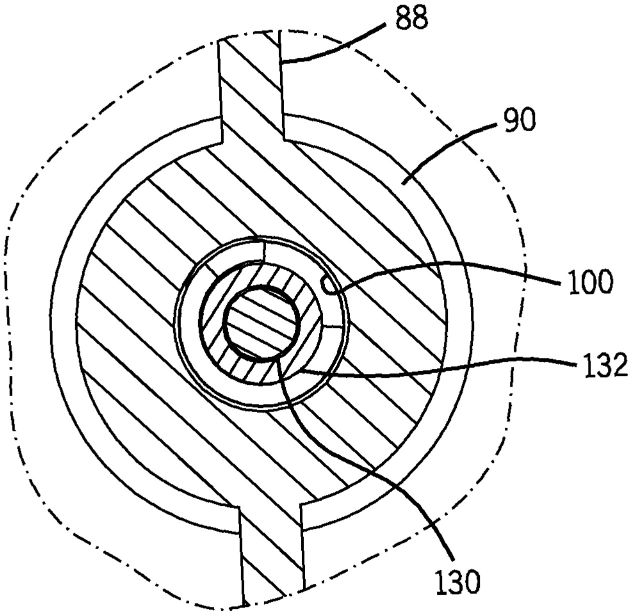
FIG. 8 is a partial section view taken along line 8-8 of FIG. 5.

An adjustment arrangement 124 is engaged with the downstream end of separator screw 62 in order to enable adjustment in the axial position of separator screw 62 within passage 66 defined by separator chamber 64. In this manner, the clearance between separator screw pressure flights 87 and the inner surface of separator chamber wall 97 can be adjusted to accommodate different material characteristics. Adjustment arrangement 124 includes a threaded adjustment member 126, which may generally be in the form of a bolt having a head 128 and a shank 130 that is threaded throughout its length, in combination with a spacer or sleeve 132 and a locking member 134, which may be in the form of a lock nut that is engageable with the threads of adjustment member 126. As shown in FIGS. 5 and 8, sleeve 132 and shank 130 of adjustment member 126 extend through passage 100 in support area and 90 defined by support 84, so that the outer end of sleeve 132, locking member 134 and head 128 of adjustment member 126 are located outwardly of the downstream end of support area 90. With this construction, sleeve 132 cooperates with passage 100 to form an annular discharge passage that is in communication with the downstream end of separator chamber passage 66 and extends through support area 90, so as to enable hard material discharged from the downstream end of separator chamber passage 66 to flow through support area 90 for collection or discharge.

Locking member 134 is engaged with the threads of adjustment member shank 130 and is located toward head 128. Shank 130 of adjustment member 126 extends through sleeve 132 and is engaged with internal threads 118 at the downstream end of axial passage 114 in separator screw 62. In operation, the end of adjustment member shank 130 is engaged with the facing end of extension section 110 of centering pin 52, and the inner end of sleeve 132 is engaged with the downstream end of separator screw 62. Locking member 134 is rotatably advanced into engagement with the outer or downstream end of sleeve 132, which thus prevents rotation of adjustment member 126 and locks the axial position of separator screw 62. When it is desired to change the axial position of separator screw 62 so as to adjust the spacing between pressure fights 87 and the inner surface of separator chamber wall 97, locking member 134 is moved toward head 128 so as to enable adjustment member 126 to be rotated. The user then rotates adjustment member 126 using head 128, and engagement between separator screw threads 118 and the threads of shank 130 function to change the axial position of separator screw 62. Relative axial movement between separator screw 62 and drive pin 122 is accommodated by slots 120 in the inner end of separator screw 62. Once the desired axial position of separator screw 62 is attained, sleeve 132 is advanced inwardly so that its inner end is engaged with the end of separator screw 62, and locking member 134 is again advanced into engagement with the outer end of sleeve 132 so as to secure the axial position of separator screw 62.

Figure 9:
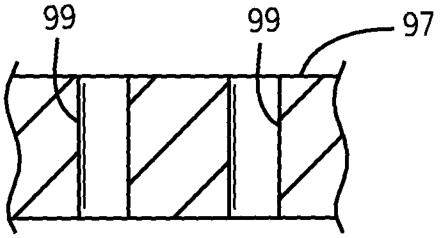
FIG. 9 is a partial enlarged section view with reference to line 9-9 of FIG. 5, showing a first embodiment of perforations in the wall of a separator chamber incorporated in the separator-type recovery system of FIG. 1.
Figure 10:
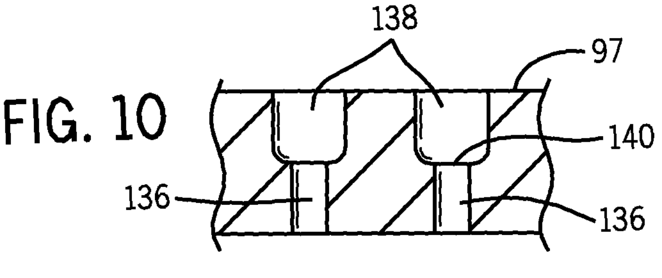
FIG. 10 is a view similar to FIG. 9, showing an alternate embodiment for the perforations in the wall of the separator chamber.
Figure 11:
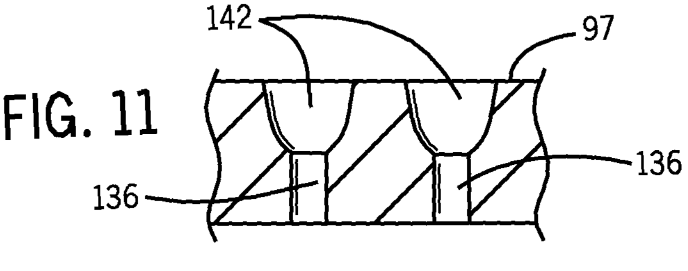
FIG. 11 is a view similar to FIGS. 9 and 10 showing another embodiment for the perforations in the wall of the separator chamber.

FIG. 9 is an enlarged view of the wall 97 of separator chamber 64, showing the discharge perforations or openings 99 that extend through the wall 97 so as to establish communication between separator chamber passage 66 and the exterior of separator chamber 64. The openings 99 as shown in FIG. 9 have a constant diameter throughout the length of each opening 99. In an alternative construction as shown in FIG. 10, the openings in the separator chamber wall 97 may be formed so as to have a reduced dimension inlet portion 136 and an expanded dimension outer portion 138. The expanded dimension outer portion 138 may be formed with a transverse inner surface shown at 140, which provides a relatively sudden transition between inlet portion 136 and outer portion 138. In an alternative embodiment as shown in FIG. 11, an expanded dimension outer portion 142 may be formed with flared side walls which provide a more gradual transition between inlet portion 136 and the exterior surface of wall 97. In both alternative embodiments, the expanded dimension outer portion provides pressure relief so as to facilitate the passage of material from passage 66 in separator chamber 64 through the openings or perforations in separator chamber wall 97 to the exterior of separator chamber 64.

It should be understood that the invention is not limited in its application to the details of construction and arrangements of the components set forth herein. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

The invention claimed is:

1. A machine comprising:

a grinder which receives meat and bone through an inlet, the grinder including a first part having a plurality of grinding openings therethrough, wherein the meat and bone engages with a surface of the first part and the meat and bone is ground into material which does not contain bone and which is discharged through the grinding openings, and the first part further having one or more collection passages therethrough for discharging a mixture of meat and bone therethrough;

an advancement member for advancing the meat and bone through the grinder;

a separator downstream of the grinder, the separator receiving the mixture of meat and bone from the collection passages through an inlet opening, wherein the separator is coupled to the grinder and the inlet opening of the separator do not cover the grinding openings of the grinder such that the material which does not contain bone is discharged to an exterior of the machine, the separator including a second part having a plurality of openings therethrough, wherein the mixture of meat and bone received from the grinder engages with a surface of the second part and is ground into material which does not contain bone and which is discharged through the openings of the separator, and the second part further having an outlet passage therethrough for discharging material containing bone therethrough; and an advancement member for advancing the meat and bone through the separator.

2. The machine of claim 1, wherein each advancement member is rotatable.

3. The machine of claim 1, wherein the grinder includes a housing and the first part is a plate connected to the housing.

4. The machine of claim 3, wherein the one or more collection passages are provided at a center of the plate.

5. The machine of claim 3, further comprising a knife proximate to the plate and within the grinder.

6. The machine of claim 3, wherein the second part is conical.

7. The machine of claim 1, further comprising a knife within the grinder.

8. The machine of claim 1, wherein the second part is conical.

* * * * *